(12) United States Patent
Moscato et al.

(10) Patent No.: US 8,616,282 B2
(45) Date of Patent: Dec. 31, 2013

(54) SYSTEM AND METHOD FOR DETERMINING DOWNHOLE FLUID PARAMETERS

(75) Inventors: Tullio Moscato, Paris (FR); Robert Van Kuijk, Le Plessis Robinson (FR); Xu Wu, Paris (FR); Jacques Jundt, Newton, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 530 days.

(21) Appl. No.: 12/824,474

(22) Filed: Jun. 28, 2010

(65) Prior Publication Data
US 2011/0315375 A1 Dec. 29, 2011

(51) Int. Cl.
*E21B 36/04* (2006.01)
*E21B 47/06* (2012.01)

(52) U.S. Cl.
USPC .......................... 166/302; 166/250.01; 166/60

(58) Field of Classification Search
USPC .................................. 166/250.01, 302, 60, 66
See application file for complete search history.

(56) References Cited

U.S. PATENT DOCUMENTS

| | | | |
|---|---|---|---|
| 5,551,287 A | 9/1996 | Maute et al. | |
| 5,984,641 A | 11/1999 | Bevan et al. | |
| 6,227,045 B1 | 5/2001 | Morse et al. | |
| 6,832,527 B2 | 12/2004 | Hiss et al. | |
| 6,854,341 B2 | 2/2005 | Oddie et al. | |
| 6,860,325 B2 | 3/2005 | Ramakrishnan et al. | |
| 7,412,881 B2 * | 8/2008 | Crawley et al. | 73/204.11 |
| 7,637,167 B2 | 12/2009 | Monmont et al. | |
| 7,644,611 B2 | 1/2010 | Kamiya et al. | |
| 7,654,318 B2 | 2/2010 | Cooper et al. | |
| 7,707,898 B2 | 5/2010 | Oddie | |
| 2006/0191683 A1 * | 8/2006 | Fukuhara et al. | 166/250.01 |
| 2007/0289739 A1 * | 12/2007 | Cooper et al. | 166/250.01 |

(Continued)

FOREIGN PATENT DOCUMENTS

| | | |
|---|---|---|
| DE | 3213902 | 10/1983 |
| DE | 3820025 | 12/1989 |

(Continued)

OTHER PUBLICATIONS

International Search Report and Written Opinion dated Dec. 9, 2011 for corresponding PCT Application No. PCT/EP2011/003184 filed Jun. 23, 2011.

*Primary Examiner* — Brad Harcourt
(74) *Attorney, Agent, or Firm* — Matthias Abrell

(57) ABSTRACT

Systems and methods for determining at least one parameter of a fluid in a well are provided. The system has a downhole system deployable into the well, and sensor elements to measure fluid parameter(s) of the fluid in the well. Each of the sensor elements is provided with a base and sensors. The base is positionable on the coiled tubing system about the injection port. The sensors are positionable in the base. Each of the sensors are thermally isolated from each other, and are capable of operating as both a heater to heat the fluid, and as a temperature sensor for measuring a temperature of the fluid. The sensors are operatively interchangeable such that the sensors may selectively heat and measure the temperature of the fluid whereby fluid parameters of the fluid are determined.

24 Claims, 5 Drawing Sheets

(56) References Cited

U.S. PATENT DOCUMENTS

| | | |
|---|---|---|
| 2008/0317095 A1* | 12/2008 | Hadley et al. ............. 374/137 |
| 2009/0038410 A1 | 2/2009 | Oddie |
| 2009/0071646 A1* | 3/2009 | Pankratz et al. ............ 166/265 |
| 2009/0266175 A1 | 10/2009 | Monmont et al. |
| 2009/0271129 A1 | 10/2009 | Monmont et al. |
| 2010/0084132 A1 | 4/2010 | Noya et al. |
| 2010/0089571 A1 | 4/2010 | Revellat et al. |

FOREIGN PATENT DOCUMENTS

| | | |
|---|---|---|
| DE | 4017877 | 12/1991 |
| EP | 0592888 | 9/1993 |
| EP | 0908712 | 9/1998 |
| EP | 2341214 A1 | 7/2011 |
| GB | 2159631 | 12/1985 |
| GB | 2201001 | 8/1988 |

* cited by examiner

SYSTEM AND METHOD FOR DETERMINING DOWNHOLE FLUID PARAMETERS

BACKGROUND OF THE INVENTION

1. Field of the Invention

The present invention relates to techniques for determining fluid parameters. More particularly, the present invention relates to techniques for determining downhole fluid parameters, such as fluid direction and fluid velocity.

2. Background of the Related Art

Oil rigs are positioned at wellsites for performing a variety of oilfield operations, such as drilling a well, performing downhole testing and producing located hydrocarbons. Downhole drilling tools are advanced into the earth from a surface rig to form a well. During or after drilling, casing is typically cemented into place to line at least a portion of the well. Once the well is formed, production tools may be positioned about the well to draw fluids to the surface.

Oilfield operations are generally complicated, time consuming and very expensive endeavors. In recognition of these expenses, added emphasis has been placed on well logging, profiling and monitoring of well conditions. Over the years, the detecting and monitoring of well conditions has become a more sophisticated and critical part of managing well operations. During these operations, initial gathering of information relative to well and surrounding formation conditions may be obtained by running a logging tool into the well. The logging tool may be configured to acquire temperature, pressure, acidity, viscosity, resistivity, composition, and/or other downhole parameters that provide well condition information. A map of the acquired information may be generated, resulting in an overall profile of the well which may be of great value in subsequent monitoring and servicing of the well.

The oilfield operations often involve servicing of the well by way of coiled tubing applications, particularly in the case of deviated wells. Coiled tubing applications involve the deployment of a string of coiled tubing, which is capable of delivering treatment fluids and carrying out a variety of downhole servicing applications, into the well. It may be useful, during such operations, to know various downhole parameters. In particular, knowledge of characteristics of various downhole fluids, such as hydrocarbons, water, drilling muds, gases, etc., and fluid parameters relating thereto, such as temperature and pressure, may be useful in monitoring performance, safety, characteristics, etc. In particular, knowledge of fluid and other parameters may be used to assist in locating and treating subsurface reservoirs containing valuable hydrocarbons. Reservoir treatment may involve, for example, production logging (PL) and/or fluid diversion & placement.

In order to determine downhole fluid parameters, fluid sensors are often used to take fluid measurements. Examples of fluid sensors that have been used are spinners, electromagnetic (EM) flow meters, ultrasonic flow meters (Doppler based), and various kinds of tracers (e.g. radioactive). In some cases, fluid sensors may be thermal based sensors, such as time of flight, anemometry, calorimetric, etc. Examples of existing fluid sensors and/or measurement techniques are described in Patent/Application Nos. US20090204346, US20090090176, U.S. Pat. No. 6,801,039, US20090153155, US20090266175, US20090038410, US20100089571, US20090271129, U.S. Pat. No. 7,644,611, U.S. Pat. No. 7,637,167, U.S. Pat. No. 7,258,005, U.S. Pat. No. 6,832,527, U.S. Pat. No. 5,457,396, U.S. Pat. No. 6,527,923, U.S. Pat. No. 4,608,983, DE3213902, DE3820025, DE4017877, EP592888 and EP 0908712. Some cases involve the use of fluid sensors to measure fluid flow rates as described, for example, in GB Patent Application Nos. 2159631 and 2201001. Other cases involve the use of fluid sensors in downhole applications as described, for example, in US Patent/Application Nos. 20100084132, U.S. Pat. Nos. 7,707,898, 6,860,325, and 6,854,341.

Despite the development of techniques for measuring fluids using fluid sensors, there remains a need to provide advanced techniques for determining fluid parameters usable in downhole applications. It may be desirable to provide techniques that determine fluid parameters relating to fluid flow. It may be further desirable to provide techniques that are capable of taking accurate measurements, even in difficult conditions (e.g., harsh conditions, low flow rates, etc.) Preferably, such techniques involve one or more of the following, among others: accuracy of measurements, optimized measurement processes, minimized components, reduced size, robust capabilities, reliability, operability in even harsh downhole conditions, non-intrusive positioning, good response at even very low flow rates & velocities, detection of flow parameters over full range of measurement, simple packaging, resistance to aggressive media (e.g., acid and downhole conditions), measurement methodologies tailored to the equipment used, adjustability to sensor size, operability in downhole conditions (e.g., at high temperatures and/or pressures), etc. The present invention is directed at achieving these needs.

SUMMARY OF THE INVENTION

In one aspect, the present invention relates to a sensor element for determining at least one parameter of a fluid in a well having a downhole system deployed therein. The sensor element has a base positionable on the downhole system, and a plurality of sensors positionable in the base. Each of the sensors is thermally isolated from each other. Each of the sensors is capable of operating as both a heater to heat the fluid and as a temperature sensor for measuring a temperature of the fluid. The sensors are operatively interchangeable such that the sensors may selectively heat and measure the temperature of the fluid whereby at least one fluid parameter of the fluid is determined.

The downhole system may be a coiled tubing system having an injection port for injecting the fluid into the well, the base positionable about the injection port. The base may be positioned on an outer surface of the downhole system, or recessed below the outer surface of the downhole system. An outer surface of the base may also be flush with the outer surface of the downhole system, or positionable on an inner surface of the downhole system for measuring fluid passing therethrough.

At least one of the sensors may be an RTD sensor comprising a resistor and a substrate. The RTD sensor may be encapsulated in the base, adhered to a thermally conductive pad, brazed onto the thermally conductive pad, and/or bonded onto the thermally conductive pad. The sensors may comprise a heater and a pair of thermocouple junctions. The thermocouple junctions may be linked by a conductor. The sensing system may further have at least one additional sensor for measuring at least one downhole parameter, such as pressure, viscosity, resistivity, acidity, and/or composition. The fluid parameters measured may be fluid direction or velocity of the fluid. The sensors may be operatively connectable to a power source, such as a battery.

In another aspect, the invention relates to a system for determining at least one parameter of a fluid in a well. The system has a downhole system deployable into the well and a plurality of sensor elements for measuring at least one fluid parameter of the fluid in the well. Each of the plurality of sensor elements has a base positionable on the downhole system and a plurality of sensors positionable in the sensor base. Each of the sensors is thermally isolated from each other. Each of the sensors is capable of operating as both a heater to heat the fluid and as a temperature sensor for measuring a temperature of the fluid. The sensors are operatively interchangeable such that the sensors may selectively heat and measure the temperature of the fluid whereby fluid parameters of the fluid are determined.

The downhole system may be a coiled tubing system comprising an injection tool having an injection port for injecting the fluid into the well. The sensor elements may comprise at least one upstream sensor element positionable upstream from the injection port and at least one downstream sensor element positionable downstream from the injection port. The fluid parameter may be calculated from the fluid measurements taken by the upstream and the downstream sensor elements. The fluid parameter may be fluid direction and/or fluid velocity. The system and/or at least one of the sensor elements may further comprise at least one additional sensor for measuring downhole parameters. The downhole system may comprise a logging tool. The sensor elements are preferably capable of taking redundant measurements for cross-checking therebetween.

Finally, in another aspect, the present invention relates to a method for determining at least one parameter of a fluid in a well. The method involves deploying a downhole system into the well with a plurality of sensor elements thereon, each of the plurality of sensor elements comprising at least one heater and at least one temperature sensor. The method further involves taking at least one primary fluid measurement of the fluid in the well with a first portion of the plurality of sensor elements operating as a heater and a second portion of the plurality of sensor elements operating as a temperature sensor, taking at least one secondary fluid measurement of the fluid in the well with the second portion of the plurality of sensor elements operating as a heater and the first portion of the plurality of sensor elements operating as a temperature sensor and determining at least one fluid parameter from the at least one primary and secondary fluid measurements.

The step of determining may involve calculating the direction of the fluid from the primary and secondary fluid measurements. The step of determining may involve calculating a velocity of the fluid from the primary and secondary fluid measurements. The downhole system may comprise a coiled tubing system and the method further involve injecting fluid from the coiled tubing system into the well through an injection port of the coiled tubing system. At least one of the sensor elements may be positioned upstream from the injection port and at least one of the sensor elements may be positioned downstream from the injection port. The method may further involve determining the at least one fluid parameter by comparing the fluid measurements taken by the upstream and the downstream sensor elements. The method may further involve taking additional fluid measurements for comparison with the primary and secondary fluid measurements.

Techniques (e.g., methods and systems) of the invention will become more apparent upon review of the brief description of the drawings, the detailed description of the invention, and the claims that follow.

BRIEF DESCRIPTION OF THE DRAWINGS

So that the features and advantages of the present invention can be understood in detail, a more particular description of the invention may be had by reference to the embodiments thereof that are illustrated in the appended drawings. These drawings are used to illustrate only typical embodiments of this invention, and are not to be considered limiting of its scope, for the invention may admit to other equally effective embodiments. The figures are not necessarily to scale and certain features and certain views of the figures may be shown exaggerated in scale or in schematic in the interest of clarity and conciseness.

FIG. 2A is a longitudinal view, partially in cross-section of the portion of the coiled tubing system positioned in the well. FIG. 2B is a horizontal, cross-sectional view of the portion of the coiled tubing system positioned in the well against a wall thereof with the sensing elements on an outer surface thereof. FIG. 2C is a horizontal cross-sectional view of another portion of the coiled tubing system positioned in the well with the sensing elements on an inner surface thereof.

FIG. 4A is a thermocouple sensing element. FIG. 4B is a dual-element sensing element.

DETAILED DESCRIPTION OF THE INVENTION

Presently preferred embodiments of the invention are shown in the above-identified figures and described in detail below. Embodiments are described with reference to certain features and techniques of fluid sensing systems deployed into a well by a coiled tubing system. As such, depicted embodiments focus on advantages, such as fluid sensing capabilities, made available by the use of sensing systems positioned on treatment tools of the coiled tubing system. However, a variety of configurations may be employed with and without treatment tools. That is, a fluid sensing element may be employed apart from the coiled tubing system. Regardless, embodiments described herein are employed that include a fluid sensing system deliverable downhole via coiled tubing, while employing a fluid sensing element for measuring fluid parameters. Thus, at a minimum, fluid parameters, such as fluid direction (or direction of the fluid) and/or fluid velocity (or velocity of the fluid), may be determined.

Figure 1:
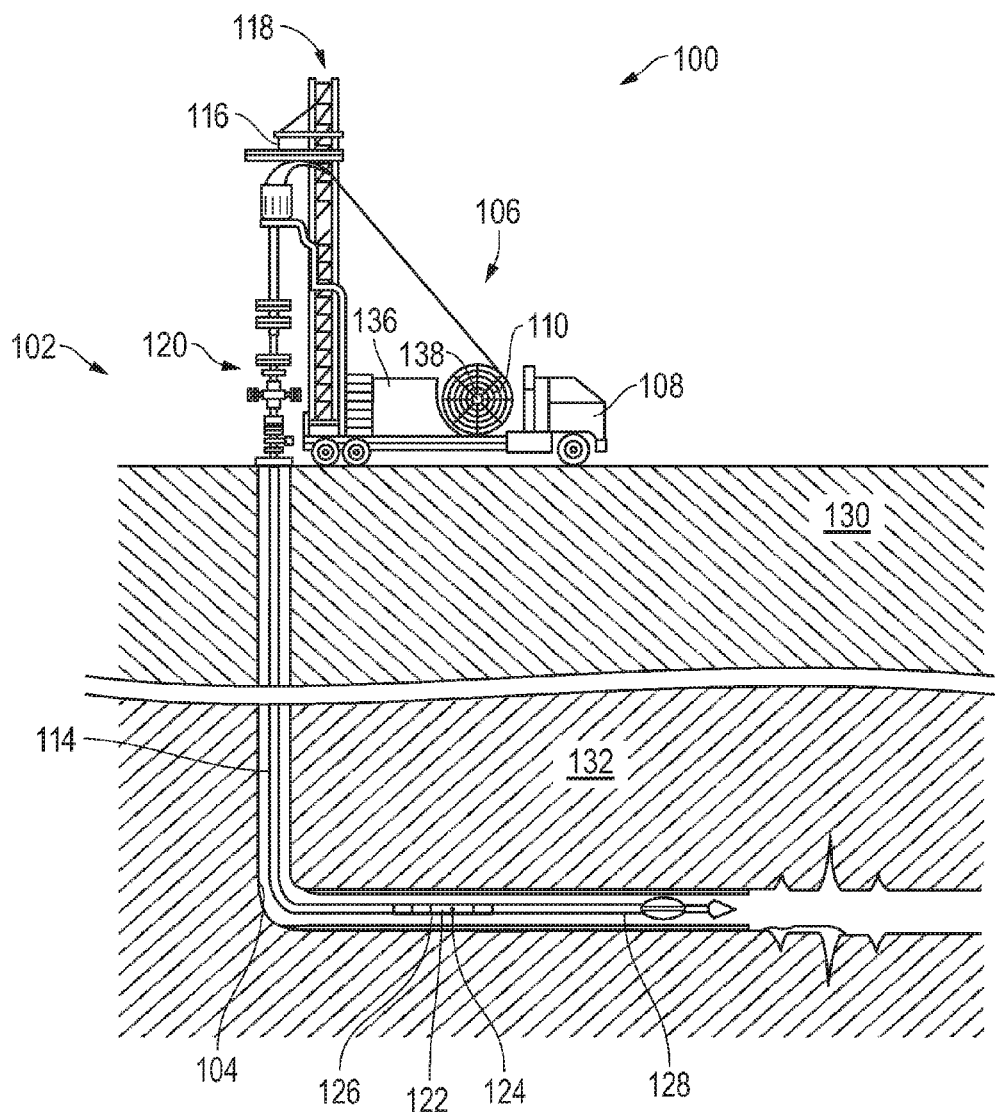
FIG. 1 is a schematic depiction of a wellsite with a coiled tubing system deployed into a well, the coiled tubing system having a fluid sensing system thereon for determining fluid parameters.

FIG. 1 is a schematic depiction of a wellsite 100 with a coiled tubing system 102 deployed into a well 104. The coiled tubing system 102 includes surface delivery equipment 106, including a coiled tubing truck 108 with reel 110, positioned adjacent the well 104 at the wellsite 100. The coiled tubing system 102 also includes coiled tubing 114 that may be used to pump a fluid into the well 104. With the coiled tubing 114 run through a conventional gooseneck injector 116 supported by a mast 118 over the well 104, the coiled tubing 114 may then be advanced into the well 104. That is, the coiled tubing 114 may be forced down through valving and pressure control equipment 120 and into the well 104.

In the coiled tubing system 102 as shown, a treatment device 122 is provided for delivering fluids downhole during a treatment application. The treatment device 122 is preferably deployable into the well 104 to carry fluids, such as an acidizing agent or other treatment fluid, and disperse the fluids through at least one injection port 124 of the treatment device 122.

The coiled tubing system 102 of FIG. 1 is depicted as having a fluid sensing system 126 positioned about the injection port 124 for determining parameters of fluids in the well 104. The fluid sensing system 126 is preferably configured to determine fluid parameters, such as fluid direction and/or velocity. Other downhole parameters may also be determined, if desired.

Continuing with reference to FIG. 1, the coiled tubing system 102 may optionally be provided with a logging tool 128 for collecting downhole data. The logging tool 128 as shown is provided near a downhole end of the coiled tubing 114. The logging tool 128 is preferably configured to acquire a variety of logging data from the well 104 and surrounding formation layers 130, 132, such as those depicted in FIG. 1. The logging tool 128 is preferably provided with a host of well profile generating equipment or implements configured for production logging directed at acquiring well fluids and formation measurements from which an overall production profile may be developed. Other logging, data acquisition, monitoring, imagining and/or other devices and/or capabilities may be provided to acquire data relative to a variety of well characteristics. Information gathered may be acquired at the surface in a high speed manner, and, where appropriate, put to immediate real-time use (e.g. via a treatment application).

With reference still to FIG. 1, the coiled tubing 114 with the treatment device 122, fluid sensing system 126 and logging tool 128 thereon is deployed downhole. As these components are deployed, treatment, sensing and/or logging applications may be directed by way of a control unit 136 at the surface. For example, the treatment device 122 may be activated to release fluid from injection port 124; the fluid sensing system 126 may be activated to collect fluid measurements; and/or the logging tool 128 may be activated to log downhole data, as desired. The treatment device 122, fluid sensing system 126 and logging tool 128 are preferably in communication with the control unit 136 via a communication link (not shown) for passing signals (e.g., power, communication, control, etc.) therebetween.

The control unit 136 is depicted as computerized equipment secured to the truck 108. However, the control unit 136 may be of a more mobile variety such as a laptop computer. Additionally, powered controlling of the application may be hydraulic, pneumatic and/or electrical. Regardless, the wireless nature of the communication allows the control unit 136 to control the operation, even in circumstances where subsequent different application assemblies may be deployed downhole. That is, the need for a subsequent mobilization of control equipment may be eliminated.

The control unit 136 may be configured to wirelessly communicate with a transceiver hub 138 of the coiled tubing reel 110. The receiver hub 138 is configured for communication onsite (surface and/or downhole) and/or offsite as desired. Preferably, the control unit 136 communicates with the sensing system 126 and/or logging tool 128 for passing data therebetween. The control unit 136 may be provided with and/or coupled to databases, processors, and/or communicators for collecting, storing, analyzing, and/or processing data collected from the sensing system and/or logging tool.

Figure 2A:
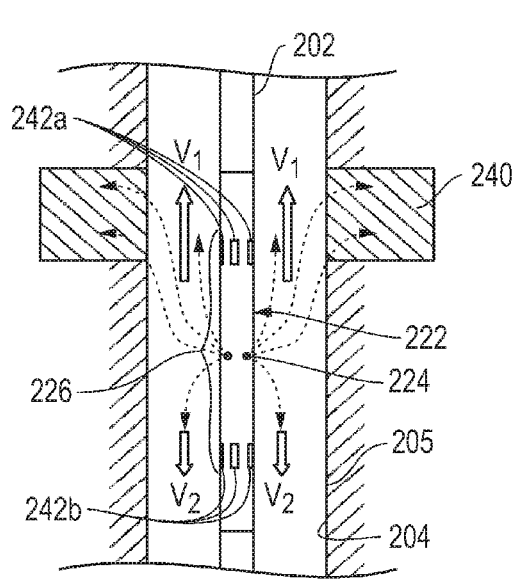
FIGS. 2A-2C are schematic views of a portion of a coiled tubing system with a fluid sensing system thereon positionable in a well, the fluid sensing system comprising a plurality of sensing elements.
Figure 2B:
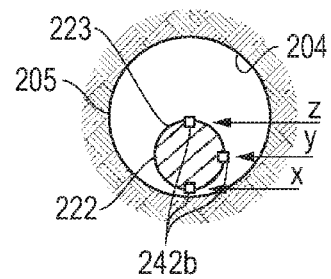
Figure 2C:
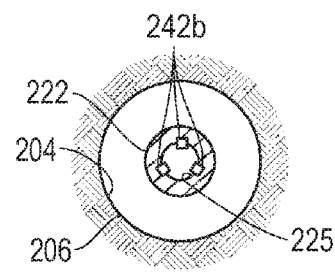

FIGS. 2A-2C are schematic views of a portion of a coiled tubing system 202 with a treatment device 222 and fluid sensing system 226 on a coiled tubing 214 thereof, usable as the coiled tubing system 102, treatment device 122 and fluid sensing system 126 of FIG. 1. FIG. 2A is a longitudinal view, partially in cross-section depicting the fluid sensing system 226 positioned about treatment device 222. As shown, the treatment device 222 has injection ports 224 for dispersing injection fluids into the well 204 as schematically depicted by the dashed arrows.

The injection fluid may be dispersed to treat a portion of the well 204, such as pay zone 240, to enhance production of fluid therefrom. As illustrated in FIG. 2A, stimulation fluid, such as acid, may be injected into the well 204 nearby the pay (or oil producing) zone 240 by means of the treatment tool 222. The acid is intended for the pay zone 240, but is shown positioned downhole therefrom. Precisely positioning the injection ports 224 against the zone of interest may be a challenging task due to uncertainties that may exist in target depth and/or tool position. The sensing system 226 around injection port 224 may be tailored to measure the flow split upstream and downstream of the injection ports 224 in the well. The determined fluid movement may be used to indicate where the pay zone 240 is located relative to the injection port 224. Once known, the position of the treatment device 222 and injection ports 224 may be positioned to effect treatment as desired.

As fluid is released from the treatment device 222, the flow of the fluid is split with an upstream portion of the injection fluid moving upstream and a downstream portion of the injection fluid moving downstream. The upstream portion of the injection fluid travels upstream at a given velocity as indicated by the arrows labeled V1. The downstream portion of the injection fluid travels downstream at a given velocity as indicated by the arrows labeled V2. While the fluid is depicted as flowing in a specific direction, it will be appreciated that the flow of the fluid may vary with the given operating conditions.

While the sensing system 226 is depicted in FIGS. 1 and 2A-2C as being positioned in a coiled tubing system 102 for determining fluid parameters about an injection port 224, it will be appreciated that the sensing system 226 may also be used in other fluid flow applications, such as detection of fluid cross-flow between zones, production logging (e.g., for single phase velocity, or in conjunction with Flow Scanner Imaging (FSI) complementary to a spinner in a low velocity range), downhole or surface testing as part of a flowmeter (e.g., low speed Venturi based flowmeter applications), leakage detection (e.g., with dynamic seals), with other tools where flow velocity measurements is desired, among others. The sensing system 226 may be positioned on any surface, downhole and/or other movable equipment, such as a downhole tool, and/or in fixed equipment, such as casing (not shown).

Sensing system 226 is depicted in FIG. 2A as having a plurality of sensor elements 242a,b positioned about the treatment device 222. One or more sensor elements 242 a,b are preferably positioned about the coiled tubing system 102 to take fluid and/or other downhole measurements. Preferably, the sensor elements 242a,b are positioned about the injection port(s) 224 to measure fluid parameters. The fluid measured is the injection fluid dispersed from the treatment device 222, but may also include other fluids in the well (e.g., water, hydrocarbons, gases, etc.) that mix with the injection fluid as it is dispersed.

An upstream portion of the sensor elements 242a are depicted as being positioned on the treatment device 222 a distance upstream therefrom. A downstream portion of the sensor elements 242b are depicted as being positioned on the treatment device 222 a distance downstream therefrom. The upstream sensor elements 242a and/or downstream sensor elements 242b may be arranged radially about the treatment apparatus 222. As shown in FIG. 2B, the sensor elements 242a,b are preferably positioned at various radial locations x,y,z about the treatment apparatus 222. While a specific configuration for the sensor elements 242a,b is depicted in FIGS. 2A and 2B, it will be appreciated that one or more sensor elements may be positioned at various locations (longitudinally and/or radially) about the coiled tubing system 102 and/or well 104.

At least some of the sensor elements 242a,b are preferably capable of sensing fluid parameters, such as fluid direction and velocity. Preferably, more than one of the sensor elements 242a,b are capable of measuring the fluid parameters. At least one of the sensor elements 242a for measuring fluid parameters is preferably positioned upstream from the injection port 224, and at least one of the sensor elements 242b for measuring fluid parameters is preferably positioned downstream from the injection port 224. In this configuration, the measurements of the upstream and the downstream fluid sensors 242a,b may be compared to determine fluid parameters, such as fluid direction and/or fluid velocity. The ratio between upper and lower velocities and fluid direction obtained from measurements of the upstream and downstream sensing elements 242a,b may be used to generate real-time monitoring of where the fluid is going during the treatment, as will be described further herein. Other downhole parameters may also optionally be measured with the fluid sensing system 226 and/or other sensors positioned about the well.

Comparison of multiple sensing elements 242a,b may be used to account for differences in measurements taken by the various sensing elements 242a,b. Preferably, multiple sensing elements 242a,b are used to provide sufficient redundancy and confidence in the measurement results. This redundancy may also reduce the severity of impact where one or more sensor elements 242a,b may fail, such as in harsh downhole environments involving the use of acids. The multiple sensing elements 242a,b may also be used to generate the desired fluid direction and/or velocity information. In such cases, at least one upstream sensor element 242a and at least one downstream sensor element 242b may be used. Additional sensor elements 242a,b are preferably provided to enhance reliability in the values generated.

In some cases, it may be useful to consider the position of the sensing element 242a,b about the treatment tool 222. The number of arrays (or sets of sensing elements 242a,b), as well as the number of sensing elements 242a,b per array, may vary as necessary. As shown in FIG. 2A, the sensing elements 242a,b are positioned upstream and downstream to measure fluid as it passes upstream and downstream from the injection ports 224. When using corresponding upstream and downstream sensing elements 242a,b, the corresponding sensing elements 242a,b, are preferably positioned at equal distances from the injection port 224. Also, corresponding sensing elements 242a,b are also preferably identically matched. Matched sensing elements are preferably spaced at equal distances to eliminate potential differences in measurements.

Multiple sensing elements 242a,b are also preferably positioned about the circumference of the tool at 90-degree intervals x, y, z as shown in FIG. 2B. As shown in FIG. 2B, the sensing elements 242b are positioned at radial locations x, y and z about the treatment device 222. The sensing element 242b at position x is against a wall 205 of the well 204. The azimuthal arrangement of sensing elements 242a,b at positions x, y, z provides redundancy in case one side of measurements is impeded.

An issue may appear when the tool body (e.g., the treatment tool 222) is eccentric (or not concentric) with the well 204 as shown in FIG. 2B. In this case, some sensing elements $242b_x$ located closer to the wall 205 of the well 204 may read a lower flow value than sensing elements $242b_y$, $242b_z$ positioned farther from the wall. In such cases, it may be desirable to eliminate measurements from potential obstructed sensing elements, such as sensing element $242b_x$.

As shown in FIG. 2B, the sensing elements 242b are positioned on an outer surface 223 of the treatment tool 222. The sensing elements 242b may be flush with the outer surface 223, recessed below the outer surface 223 or extended a distance therefrom. Preferably, the sensing elements 242b are positioned such that each sensing element 242b contacts fluid for measurement thereof, but remains protected. To prevent damage in harsh downhole conditions, it may be preferably to reduce protrusion of the sensing elements 242b from the treatment tool. As shown in FIG. 2C, the sensing elements 242b may also be positioned inside the treatment tool 222, for example, on an inner surface 225 thereof.

Figure 3:
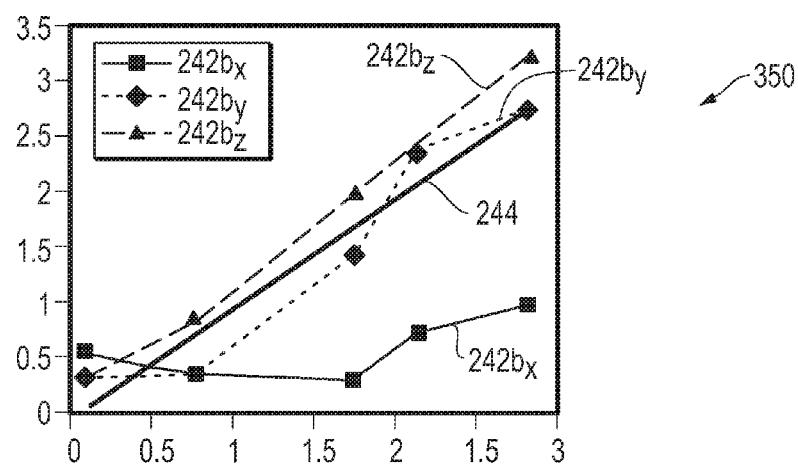
FIG. 3 is a graph depicting sensor measurements taken from the fluid sensing system of FIG. 2B.

FIG. 3 is a graph 350 depicting sensor data taken from sensing elements 242b as depicted in FIG. 2B. The graph 350 plots flow velocity (x-axis) as a function of sensor output (y-axis) for sensing elements $242b_x$, $242b_y$, and $242b_z$ at positions x, y and z, respectively. As depicted by the graph, the flow velocity of the sensing elements $242b_y$ and $242b_z$ at positions y and z are very different from the flow velocity of the sensing element $242b_x$ at position x. In other words, the readings of both the top sensing element $242b_z$ and the 90-degree sensing element $242b_y$ are substantially consistent in determining the flow velocity. However the bottom sensing element $242b_x$ has a flow velocity that is significantly lower.

This graph indicates that the sensing element $242b_x$ at position x is pressed against the wall 205 of the well 204 and is unable to take proper readings. Thus, the measurements depicted by line $242b_x$ taken by sensing element 242b at position x may be disregarded. The measurements depicted as line $242b_y$ and $242b_z$ taken by sensing elements 242b at positions y and z, respectively, may be combined using conventional analytical techniques (e.g., curve fitting, averaging, etc.) to generate an imposed flow 244. Thus, by placing several sensing elements 242a,b azimuthally around the circumference of a tool and detecting the lowest reading sensing element (e.g., $242b_x$), the azimuth of flow obstruction may be determined. The sensing element located opposite to the lowest-reading sensing element (e.g., $242b_y$), or combinations of other sensing elements, may then be used to perform the flow measurement.

Figure 4A:
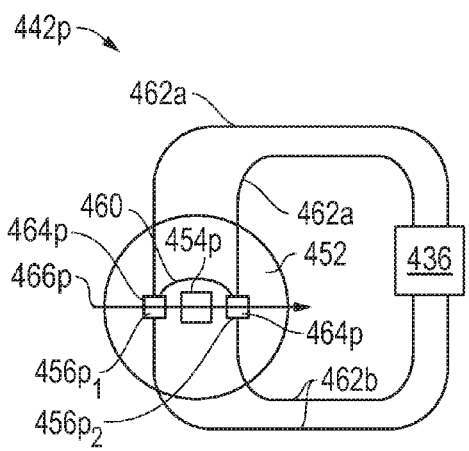
FIGS. 4A and 4B are schematic views of sensor elements.
Figure 4B:
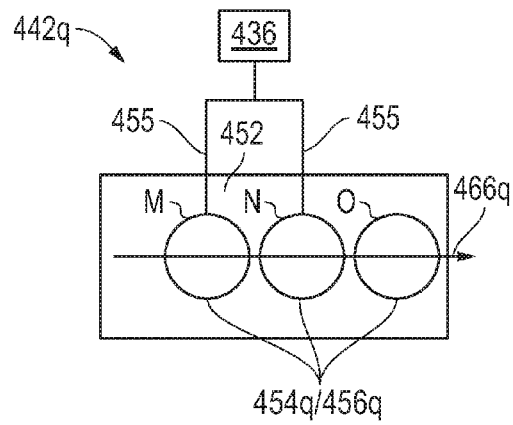

FIGS. 4A and 4B are schematic views of sensing elements 442p and 442q usable as the sensing elements 242a,b of FIGS. 2A and 2B. Each of the sensing elements 442p,q have a heater 454p,q and a sensor 456p,q, respectively, positioned in a sensor base 452. The sensor 456p,q is preferably a temperature sensor (or temperature sensor) capable of measuring fluid temperature.

The sensor elements 442p,q are preferably calorimetric type flow sensors (or flow meters) that have two sensing elements, namely a sensor for velocity measurement (scalar sensor) and a sensor for directional measurement (vector sensor). The heater 454p,q and temperature sensor 456p,q interact to operate as velocity (or scalar) and directional (or vector) sensors.

To determine fluid velocity, the sensing elements 442p,q act as calorimetric sensors. The heater 454p,q (or hot body) of each sensor elements 442p,q is placed in thermal contact with the fluid in the well 104. The rate of heat loss of the heater 454p,q to the fluid is a function of the fluid velocity as well as thermal properties. A heat dissipation rate of the heater 454p,q may be measured, and a flow velocity can be determined for a known fluid. The heater 454p,q generates heat (typically from electricity), and dissipates the heat to the fluid in contact. The rate of heat generation and the temperature is preferably readily measurable during operation.

The temperature sensor 456p,q may be used to monitor ambient temperature of the fluid, while the heater 454p,q is preferably capable of measuring its own temperature during heating. The difference between the temperature of the heater 454p,q and the ambient temperature of the fluid is defined as the temperature excursion. Temperature excursion $\Delta T$ may be written as follows:

$$\Delta T = T_h - T_a \qquad \text{Equation (1)}$$

where:

$T_a$—represents the ambient temperature of the fluid as measured by the temperature sensor;

$T_h$—represents the temperature of the heater; and

The temperature excursion is proportional to the heater power at a given flow condition. Thermal conductance $G_{th}$ may be calculated according to following expression:

$$G_{th} = \frac{P}{T_h - T_a} = \frac{P}{\Delta T} \qquad \text{Equation (2)}$$

where:

P—represents the heater power in steady state.

The inverse of this proportionality (or the thermal conductance) correlates the flow velocity $V_{flow}$, since $V_{flow}$ is a function of $G_{th}$.

The measurements taken by the calorimetric sensing elements 454p,q essentially obtain the heater-fluid thermal conductance. As provided by Equation 1, the thermal conductance is determined from three quantities: P (the heater power), $T_h$ (the temperature of the heater) and $T_a$ (the temperature of the fluid ambient). All are preferably measured in steady state. Theoretically, the amount of power or temperature excursion used during measurement should be immaterial to resultant thermal conductance. However, power and temperature excursion may affect accuracy, since all physical measurements typically have limits. In some cases, such as the configuration of FIG. 4B, a $\Delta T$ of a few degrees in Kelvin (K) may be considered appropriate.

A strategy of measurement may involve either constant excursion or constant power. For the constant excursion strategy, power sent to the heater may be regulated by electronics (e.g., control unit 136) such that the heater temperature may be maintained at a constant excursion above the fluid ambient. In steady state, the power measured is directly proportional to the thermal conductance. For the constant power strategy, the heater may be fed with a constant and predetermined power, while the heater temperature $T_h$ varies and may be determined by flow velocity. In steady state, the temperature excursion is inversely proportional to the thermal conductance.

Figure 5A:
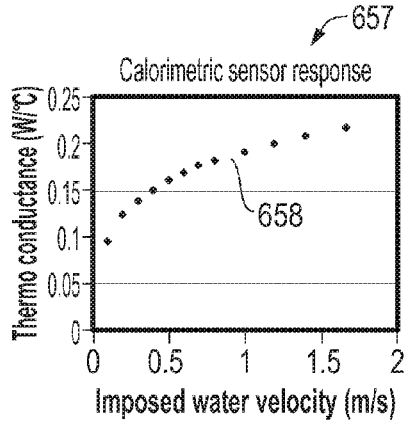
FIGS. 5A and 5B are graphs depicting sensor measurements.

FIG. 5A is a graph 657 depicting a typical flow response of a calorimetric sensor, such as the sensing elements 442a,b depicted in FIGS. 4A and 4B. The resulting thermal conductance verses flow curve 658 demonstrates that thermal conductance is considered non-linear with the flow velocity. The thermal conductance verses flow curve 658 is however monotonic. Therefore, a correlation can be established to invert the measurement, and the flow velocity can thus be obtained as described in Equations 1-3.

The measurement of flow velocity is a measurement of the thermal conductance between the heater 454p,q and the fluid. The measurement of thermal conductance may be determined with constant temperature excursion ($\Delta T$) or constant heater power. The constant temperature excursion may regulate temperature. The constant heater power may regulate power. The two are preferably equivalent, since both may be used to measure the thermal conductance. Either way of measurement preferably involves two sensing elements, such as heater 454p,q and temperature sensor 456p,q.

Referring back to FIGS. 4A and 4B, the sensing elements 442p,q may also act as scalar sensors to determine fluid direction. The sensing elements 442p,q are preferably capable of acting as both calorimetric sensors for determining fluid velocity and vector sensors for measuring fluid direction. Calorimetric sensors are typically blind to fluid direction. Typical calorimetric sensors may respond to fluid velocity regardless of direction. Fluid direction may be acquired by a second measurement, such as vector sensors capable of fluid direction detection. Fluid direction may also be acquired by, for example, the sensing elements 442p,q of FIGS. 4A and 4B configured for measurement of both fluid velocity and direction. The physics that enables directional detection may also involve detection of asymmetry in temperature between upstream and downstream sensing elements, such as the upstream sensing elements 242a and the downstream sensing elements 242b of FIG. 2A.

FIGS. 4A and 4B depict configurations of the sensing element 442p,q capable of detecting both fluid flow and direction. FIG. 4A depicts a thermocouple (TC) sensing element 442p. FIG. 4B depicts a dual sensing element 442q. The base 452 for each sensing element 442p,q is preferably sized for hosting the heater 454p,q, the sensor 456p,q and/or other devices therein.

Preferably, the base 452 has a minimum thickness, or is recessed in the downhole tool, to prevent damage in the well 104. The sensor base 452 is positionable downhole, for example, on the treatment device 122,222 and/or the coiled tubing 114, 214 (FIGS. 1, 2A, 2B). The base 452 may be round as shown in FIG. 4A, or rectangular as shown in FIG. 4B. The base may be made of epoxy, PEEK molding or other material.

The heater 454p,q and temperature sensor 456p,q are preferably positioned in close proximity in base 452, but are thermally isolated from each other. Since the heater 454p,q creates a temperature anomaly in the fluid, the temperature sensor 456p,q is preferably provided with sufficient thermal isolation from the heater 454p,q to prevent the temperature sensor 456p,q from being disturbed by the heat flux of the heater 454p,q or thermally coupling with the heater 454p,q, which may result in a measurement value that may otherwise be erroneous. The temperature sensor 456p,q may optionally be positioned in a separate package far from the heater 454p,q.

The TC sensing element 442p of FIG. 4A is depicted as having a pair of TC junctions (or sensors) $456p_{1,2}$ on either side of a heating pad (or heater) 454p. The TC junctions $456p_{1,2}$ are linked by a metal wire 460. Each TC junction $456p_{1,2}$ has a TC pad 458p with leads 462a,b extending therefrom. The leads 462 are also preferably wires operatively connected to a controller 436 for operation therewith.

The TC junctions 456p positioned on either side of the heater 454p may be used to detect a temperature imbalance therebetween, and convert it into a TC voltage. A small voltage will be present if the two TC junctions $456p_{1,2}$ are at a different temperatures. The TC junctions $456p_{1,2}$ are preferably positioned very close to the heater $454p$ (one on each side) for maximum contrast of temperature. At zero flow, the heater $454p$ may heat up both TC junctions $456p_{1,2}$. The heating, however, preferably does not produce voltage as TC junctions $456p_{1,2}$ preferably respond only to temperature differences between TC junctions $456p_{1,2}$.

Two small metal pads $464p$ are depicted as supporting each of the TC junctions $456p_{1,2}$. The metal pads $464p$ may be provided to improve the thermal contact between the TC junctions $456p_{1,2}$ and the fluid. The metal pads $464p$ may be useful, especially in cases where the TC junctions $456p_{1,2}$ are of a small size. The metal pads $464p$ and TC junctions $456p_{1,2}$ may be held together by thermal adhesives, such as silver epoxies. The metal pads $464p$ are preferably positioned in alignment with the heater $454p$, thereby defining a flowline $466p$ along the sensing element $442p$ as indicated by the arrow.

Figure 5B:
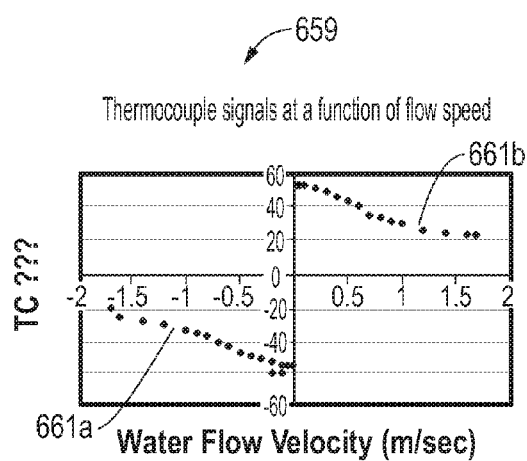

Typical TC voltage (y-axis) as a function of flow velocity (x-axis) is show in the graph 659 of FIG. 5B. The graph exhibits an odd function of the flow velocity measured by the TC junctions $456p_{1,2}$. The magnitude of the maxima near zero flow tapers off gradually with increasing velocity. At zero crossing, the TC signal output undergoes an abrupt change in polarity from negative to positive as indicated by curves 661a,b, respectively. The signal polarity may be used to detect the fluid direction, and may be particularly useful, especially around zero flow.

Figure 6:
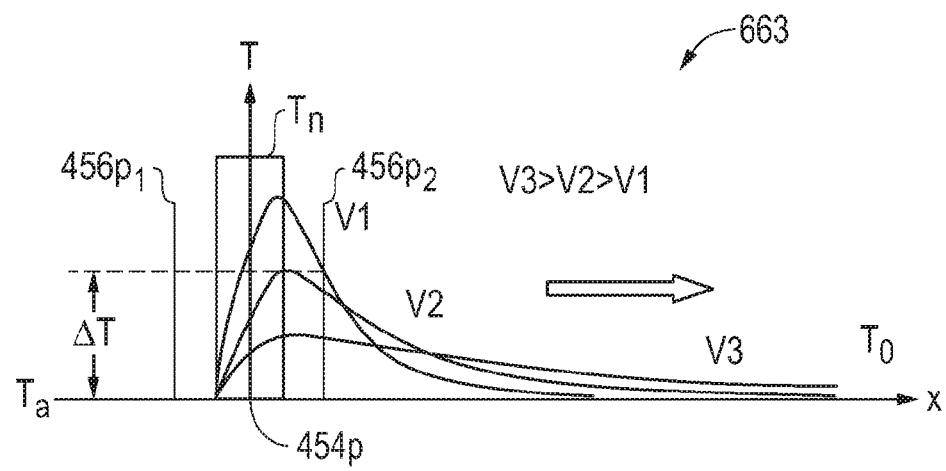
FIG. 6 is a schematic, graphical depiction of sensor measurements and fluid flow generated therefrom.

The temperature profile along a flow stream of, for example, sensing element $442p$ is schematically shown in FIG. 6. FIG. 6 is a graph 663 depicting temperature (y-axis) versus velocity (x-axis). As depicted by this graph, the heater $454p$ generates a constant heat $T_h$ measurable by the TC junction $456p_{1,2}$ on either side thereof. Heat from the heater $454p$ is carried downstream by the fluid forming a hot stream. The velocity V1, V2 and V3 are measured at, for example, different time intervals. The visibility of the thermal gradient may depend on the velocity. Thermal gradient between upstream and downstream is detectable with the sensor element $442p$. This creates a temperature contrast between upstream and downstream TC junctions $456p_{1,2}$. This indicates that the flow is moving towards TC junctions $456p_2$, thereby providing direction. By detecting the asymmetry between the TC junctions $456p_{1,2}$, the fluid direction can be determined as indicated by the arrow.

The dual-element sensing element $442q$ of FIG. 4B is depicted as having two identical elements (sensors/heaters) $456q/454q$. The sensors/heaters $456q/454q$ are depicted as Element M and Element N in the sensing element $442q$. Preferably, the heater $454q$ and the sensor $456q$ (and, therefore, Elements M and N) are interchangeable in function and operation. In such cases, the sensor $456q$ is preferably capable of performing the functions of the heater and the heater $454q$ is capable of performing the functions of the sensor. The Elements M and N are operatively linked via links 455 to controller 436 for operation therewith.

In some configurations, the desired measurement may be operated in self-referenced mode in which a single Element M or N plays a dual role, both as heater and as temperature sensor. In such cases, the heater and temperature sensor may utilize a time multiplexing scheme. Preferably, the role of the heater $454q$ and temperature sensor $456q$ may be reassigned as needed at anytime. This measurement scheme may be used to provide flexibility in designing and/or operating the sensor element $442q$, which may be tailored to particular application requirements.

An asymmetry of temperature between the identical Elements M and N is preferably detectable by the dual-element sensor $442q$. The two identical Elements M and N are preferably positioned along a line of flow of the fluid as indicated by the arrow. The Elements M and N are also preferably positioned in close proximity, for example, within the same base (or package) 452.

Measurement by the sensor element of FIG. 4B may be achieved using various methods. A first method involves measuring the heater power in flow using Element M as the heater and Element N as the temperature sensor. After a stable reading is attained, the roles of Elements M and N interchange and the measurement is repeated. Comparing the power of the two measurements, fluid direction can be ascertained. The heater that consumes higher power is located upstream, provided that the flow does not vary in the meantime. This strategy may be less reliable at low velocity as power diminishes in both cases. A second method that may be used involves measuring by heating both Elements M and N simultaneously with same amount of power. The measurements of each Element may be compared. Whichever Element reveals a higher temperature points the fluid direction. A third method that may be used involves watching the temperature of Element M while switching on and off Element N with certain power. If an alteration of temperature is noticed, Element N may be assumed to be upstream of Element M. No change may suggest otherwise.

With the first two methods, where quantities are compared across Elements M and N, a good match of characteristics of the two Elements M,N is preferred to eliminate potential error. The match of elements may be achieved by calibration and normalization. The third method, on the other hand, may not require quite as good of a match. Dual-element sensors are usable, for example, for bi-directional flow.

When the temperature sensor $456p,q$ and heater $454p,q$ of FIGS. 4A and 4B preferably reside in the same package (for instance, due to space constraint), the temperature sensor $456p,q$ is preferably positioned upstream of the heater $454p,q$ (or Element M is upstream of Element N). If flow goes in both directions, the temperature sensor $456p,q$ and heater $454p,q$ (or Elements M and N) may be positioned in a side-by-side (or flowline) configuration in line with the flow of the fluid as shown in the sensing elements $442p,q$ of FIGS. 4A and 4B.

While FIG. 4A depicts a single heater $454p$ with a pair of TC junctions $456p$ and FIG. 4B depicts a single heater $454p$ with a single temperature sensor $456q$, it will be appreciated that multiple heaters $454p,q$ and/or sensors $456p,q$ may be provided. Additional sensors and/or other devices may be incorporated into the sensing elements and/or used in combination therewith. In sensor systems involving multiple heaters, one temperature sensor $456p,q$ can serve multiple heaters $454p,q$. For example in some cases where there is more complex flow, multi-elements sensors having more than two Elements (e.g., M, N, P, D . . . ) is preferred. As shown in FIG. 4B, a third Element O may optionally be provided. In another method of measurement, the three or more elements (e.g., M,N,O) may be used to detect fluid direction by heating a middle element and comparing the temperature between upstream and downstream Elements thereabout.

As shown, the sensing elements $442p,q$ of FIGS. 4A and 4B (and/or the sensors, heaters, elements and/or other components used therein and/or therewith) are preferably operatively connected to the controller 436 for providing power, collecting data, controlling and/or otherwise operating the sensing element $442p,q$. The controller 436 may be, for example, the logging tool 128, control unit 136 and/or other electronics capable of providing power, collecting data, controlling and/or otherwise operating the temperature sensors 456$p,q$, heater 456$p,q$ and/or other elements of the sensing elements 442$p,q$. The power sources may be batteries, power supplies and/or other devices internal to and/or external to the sensing elements. In some cases, other devices, such as logging tool 128 of FIG. 1 may provide power thereto. Such electronic devices may be internal and/or external to the sensing elements. Communication devices may be provided to wire and/or wirelessly coupled the sensing elements to downhole and/or surface communication devices for communication therewith. In some cases, communication devices, such as transceivers (not shown) may be provided in the sensing elements. In other cases, the sensing elements may be linked to the logging tool 128 (FIG. 1) or other devices for communication as desired.

The sensing elements are also preferably operatively connected to and/or in communication with databases, processors, analyzers, and/or other electronic devices for manipulating the data collected thereby. The power, electronic and/or communication devices may be used to manipulate data from the sensing elements, as well as other sources. The analyzed data may be used to make decisions concerning the wellsite and operation thereof. In some cases, the data may be used to control the well operation. Some such control may be done automatically and/or manually as desired.

Figure 7:
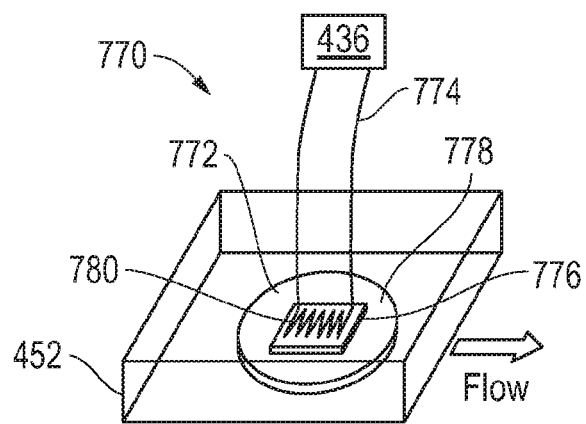
FIG. 7 is a schematic view of a sensor.

While elements of the heater and the temperature sensor may be physically identical, the sensor itself can have a variety of types, forms and/or shapes. FIG. 7 depicts a sensor 770 usable as an element of the sensor elements 454$p,q$ of FIGS. 4A and/or 4B. FIG. 7 depicts a sensor 770 usable as the heater 454$q$ and/or temperature sensor 456$q$, as Elements M, N and/or O, or in combination therewith. A shown, the sensor 770, is positionable in base 452. The sensor 770 may be operatively connected to controller 436 via wires 774 for operation therewith in the same manner as previously described for sensor elements 442$p,q$.

Preferably the sensor 770 is an RTD type sensor with a resistance that varies with temperature. RTD's are mostly used for temperature sensing purposes. However, the sensor 770 preferably may also generate heat when currents passing through. Thus an RTD can be used for as both a heater and a temperature sensor (e.g., 454$p,q$ and 456$p,q$ of FIG. 4B). A thin-film type RTD capable of use as both a heater and temperature sensor is preferably used so that it can interchangeably operate as the Element M, N and/or O of FIG. 4B when required.

As shown in FIG. 7, the surface sensor 770 positioned in base 452 has a front (or contact surface) 772 positionable adjacent the fluid for taking measurements therefrom. A common type of RTD employs platinum in the form of either wire or thin film (or resistor) 774 deposited on a heat-conductive substrate 776, such as sapphire or ceramic. The wire 774 is positioned in the film 776 and extends therefrom for operative linkage with controller 436. The heat-conductive substrate 776 may be adhered or bonded to a thin pad 778 (made of, for example, Inconel or ceramic substrate) by a thermally conductive adhesive 780, such as silver epoxy, or by brazing. Preferably such bonding provides low thermal resistance.

As depicted, the RTDs are wrapped in protective packaging, but they may differ by thermal mass and, hence, response time. The shape of the pad 778 may be square, circular or other shape capable of supporting the RTD in the base 452. The pad 778 preferably has a dimension of about 10 mm (or more or less), and a thickness sufficient for mechanical viability. The thickness and material selected may determine the performance of heater-fluid thermal contact.

The surface sensor 770 may be configured with a large surface area for contact with the fluid and/or large thermal mass for passage of heat therethrough. A larger thermal mass may result in a relatively slower in response. However, the thermal mass may also assist in reducing (e.g., averaging out) spurious variations in readings caused by turbulence. Sensor electronics may also be provided to reduce spurious variations.

The sensor 770 and/or the sensing element 442$q$ may be configured in a surface (or non-intrusive) form with a low profile (or thickness) as shown in FIGS. 7 and 4B. Sensor 770 and/or sensing element 442$q$ are preferably positionable downhole via a downhole tool (e.g., coiled tubing system 102 of FIG. 1) extending only a small distance (if any) therefrom. This low profile or non-intrusive surface form may be provided to reduce the disturbance to the fluid flowing across the sensor, while still allowing for measurement of the fluid. Moreover, the low profile surface form may also be configured to eliminate the amount of protrusion from the downhole the tool, and, therefore, potential damage thereto.

Figure 8:
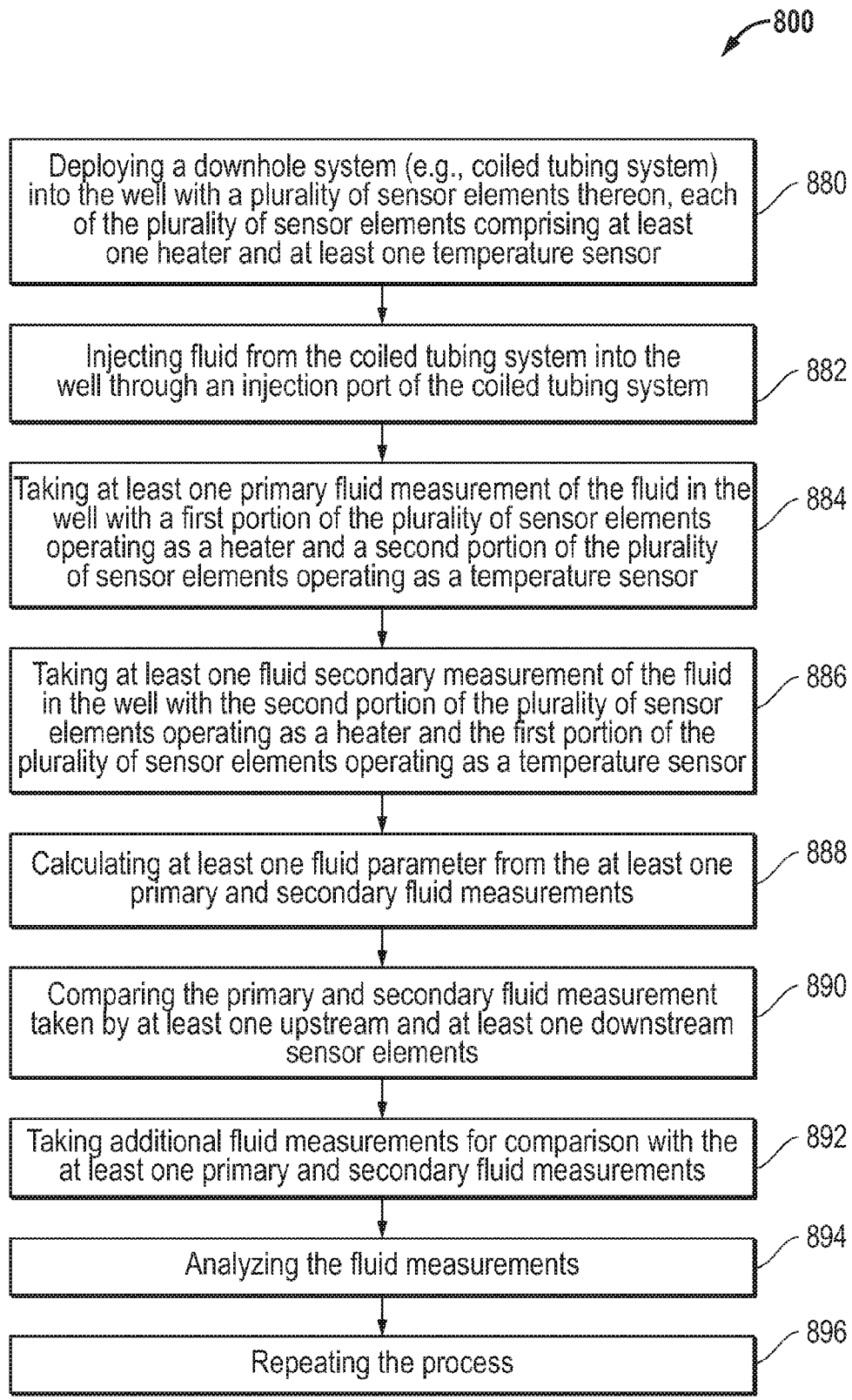
FIG. 8 is a flow chart depicting a method of determining fluid parameters.

FIG. 8 is a flow chart depicting a method 800 of determining fluid parameters. The method may be used, for example, for determining at least one parameter of a fluid in the well of FIG. 1. The method involves deploying 880 a downhole system, such as a coiled tubing system, into a well with a plurality of sensor elements thereon. Where the downhole system is a coiled tubing system, the method may also involve injecting 882 fluid from the coiled tubing into the well through an injection port of the coiled tubing.

The method may further involve taking 884 at least one primary fluid measurement of the fluid in the well with a first portion of the plurality of sensor elements operating as a heater and a second portion of the plurality of sensor elements operating as a temperature sensor, and taking 866 at least one fluid secondary measurement of the fluid in the well with the second portion of the plurality of sensor elements operating as a heater and the first portion of the plurality of sensor elements operating as a temperature sensor.

Various combinations of the primary and secondary fluid measurements may be determined from the measurements collected. At least one fluid measurement may be determined (or calculated) 888 based on the initial and secondary fluid measurements. The method may also involve comparing 890 the primary and secondary fluid measurements taken by at least one upstream and at least one downstream sensor elements, taking 892 additional fluid measurements for comparison with the at least one primary and secondary fluid measurements and analyzing 894 the fluid measurements.

The method may also involve steps for calibrating storing, processing, analyzing, reporting and/or otherwise manipulating the measurements and/or other data collected by the sensor elements and/or sensors. The process may also be repeated 896 as desired.

It will be understood from the foregoing description that various modifications and changes may be provided. For example, the one or more fluid and/or other sensing elements may be positioned about the coiled tubing system and/or other portions of the wellsite to measure and/or collect data.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. Furthermore, the foregoing description should not be read as pertaining only to the precise structures described and shown in the accompanying drawings, but rather should be read as consistent with and as support for the following claims, which are to have their fullest and fairest scope.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A sensor element for a downhole system, the sensor element comprising:
   a base positionable on the downhole system, wherein the base is flush with an outer surface of the downhole system; and
   a plurality of sensors coupled to the base, wherein the sensors are thermally isolated from each other and each of the sensors is operable as a heater to heat a fluid and as a temperature sensor to measure a temperature of the fluid, the sensors are operatively interchangeable to selectively heat and measure the temperature of the fluid to determine at least one parameter of the fluid.

2. The sensor element of claim 1, wherein the downhole system comprises a coiled tubing system having an injection port to inject the fluid into the well, the base positionable around the injection port.

3. The sensor element of claim 1, wherein at least one of the sensors comprises an RTD sensor.

4. The sensor element of claim 3, wherein the RTD sensor comprises a resistor positioned on a substrate.

5. The sensor element of claim 3, wherein the RTD sensor is encapsulated in the base.

6. The sensor element of claim 3, wherein the RTD sensor is adhered to a thermally conductive pad.

7. The sensor element of claim 6, wherein the RTD sensor is brazed onto the thermally conductive pad.

8. The sensor of claim 6, wherein the RTD sensor is bonded onto the thermally conductive pad.

9. The sensor element of claim 1, further comprising an additional sensor to measure an additional downhole parameter.

10. The sensor element of claim 1, wherein the sensors are connectable to a controller.

11. The sensor element of claim 1, wherein the sensors are connectable to a power source.

12. The sensor element of claim 11, wherein the power source comprises a battery.

13. A system to determine a parameter of a fluid in a well, the system comprising:
    a downhole system deployable into the well, wherein the downhole system comprises a coiled tubing system having an injection tool with an injection port for injecting the fluid into the well; and
    a plurality of sensor elements to measure a parameter of the fluid in the well, each of the sensor elements comprising:
    a base positionable on the downhole system; and
    a plurality of sensors coupled to the sensor base, wherein the sensors are thermally isolated from each other and each of the sensors is operable as both a heater to heat the fluid and as a temperature sensor to measure a temperature of the fluid, the sensors are operatively interchangeable to selectively heat and measure the temperature of the fluid to determine at least one parameter of the fluid.

14. The system of claim 13, wherein the plurality of sensor elements comprise at least one upstream sensor element positionable upstream from the injection port and at least one downstream sensor element positionable downstream from the injection port.

15. The system of claim 14, wherein the fluid parameter is calculated from the temperature measured by the at least one upstream sensor element and the at least one downstream sensor element.

16. The system of claim 13, further comprising an additional sensor to measure an additional downhole parameter.

17. The system of claim 13, wherein at least one of the sensor elements further comprises an additional sensor to measure an additional downhole parameter.

18. The system of claim 13, wherein the downhole system comprises a logging tool.

19. The system of claim 13, wherein the sensor elements perform redundant measurements.

20. A method for determining a parameter of a fluid in a well, the method comprising:
    deploying a downhole system into the well with a plurality of sensor elements thereon, each of the plurality of sensor elements comprising a heater and a temperature sensor;
    taking a primary fluid measurement of the fluid in the well with a first portion of the plurality of sensor elements operating as a heater and a second portion of the plurality of sensor elements operating as a temperature sensor;
    taking a secondary fluid measurement of the fluid in the well with the second portion of the plurality of sensor elements operating as a heater and the first portion of the plurality of sensor elements operating as a temperature sensor; and
    determining a flow direction or a velocity of the fluid based on the primary and secondary fluid measurements.

21. The method of claim 20, wherein the downhole system comprises a coiled tubing system and the method further comprises injecting the fluid from the coiled tubing system into the well through an injection port of the coiled tubing system.

22. The method of claim 21, wherein at least one of the sensor elements is to be positioned upstream from the injection port and at least one of the sensor elements is to be positioned downstream from the injection port.

23. The method of claim 22, further comprising determining the flow direction or the velocity by comparing the fluid measurements taken by the at least one upstream and the at least one downstream sensor elements.

24. The method of claim 20, further comprising taking additional fluid measurements to compare with the primary and secondary fluid measurements.

* * * * *